(12) United States Patent
Harness et al.

(10) Patent No.: US 6,787,113 B1
(45) Date of Patent: Sep. 7, 2004

(54) DESULFURIZATION REACTOR ASSEMBLY WITH DISPOSABLE SELF-SEALING SORBENT VESSEL

(75) Inventors: John R. Harness, Elgin, IL (US); Gavin P. Towler, Barrington, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/569,403

(22) Filed: May 12, 2000

(51) Int. Cl.[7] .............................................. B01D 53/48
(52) U.S. Cl. ...................... 422/171; 422/170; 422/173
(58) Field of Search ................................. 422/168–173

(56) References Cited

U.S. PATENT DOCUMENTS

| | | |
|---|---|---|
| 2,548,966 A | 4/1951 | Gilmore ..................... 422/191 |
| 5,344,614 A | 9/1994 | Tang ........................... 422/170 |
| 5,439,583 A | 8/1995 | Robinson et al. ............. 208/62 |

*Primary Examiner*—Hien Tran
(74) *Attorney, Agent, or Firm*—John G. Tolomei; Maryann Maas

(57) ABSTRACT

The desulfurization reactor assembly is comprised of two sections. The first section comprises a plenum base having channels therein for inflow and outflow of vapor to be reacted with the channels traversing a chamber within the plenum base through which heating medium travels. The second section includes two pieces comprising a shell engageable to the plenum base within which is seated a self-sealing sorbent vessel having channels for receiving vapor inflow from and providing reacted vapor outflow to the respective channels of the plenum base, with the canister shell providing a continuation for passage of heating medium from the plenum base therethrough. The assembly is structured to produce sealing of the vapor channels in the sorbent vessel when the vessel is removed from engagement with the plenum base.

8 Claims, 3 Drawing Sheets

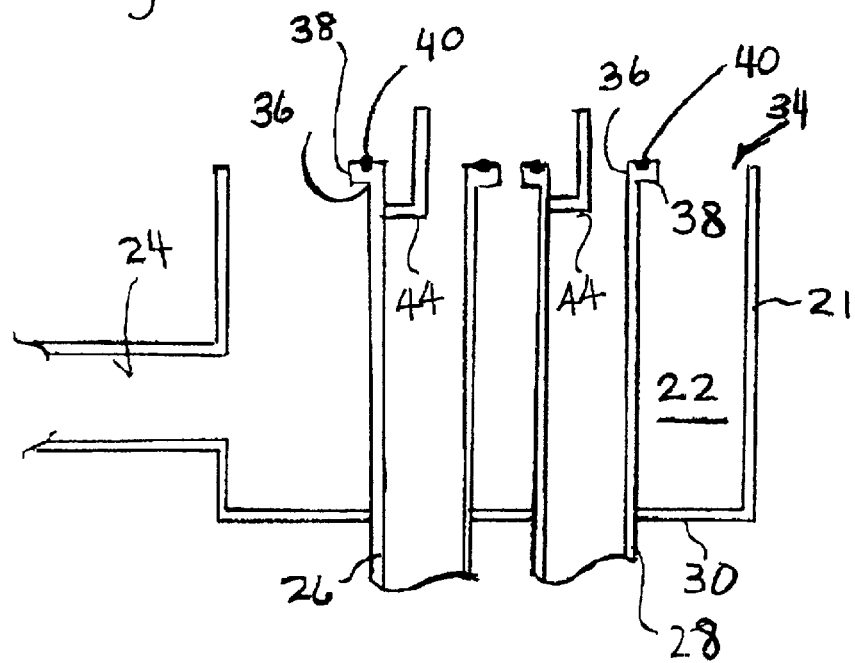
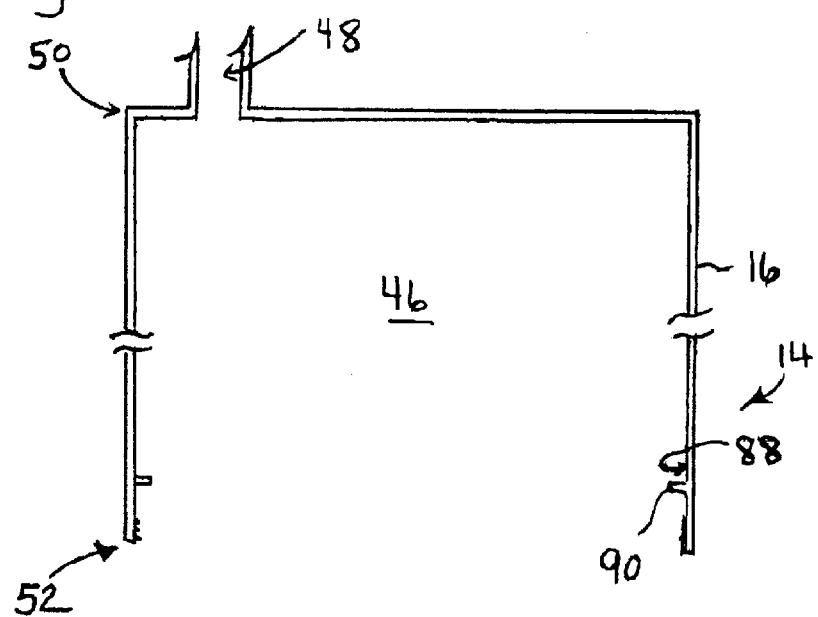

DESULFURIZATION REACTOR ASSEMBLY WITH DISPOSABLE SELF-SEALING SORBENT VESSEL

FIELD OF THE INVENTION

The present invention relates to a desulfurization reactor assembly which includes a disposable self-sealing sorbent vessel.

BACKGROUND OF THE INVENTION

It is known that fuel processors require hydrocarbon feed which is essentially sulfur-free so as not to irreversibly damage process catalysts.

The method of removing light sulfur-containing species from hydrocarbon vapor is also known. In this respect, hydrogen sulfide, mercaptans, and sulfides are removed by adsorption using ZnO and similar sorbents at elevated temperatures, such as 200° C., for example. The sorbent reacts irreversibly with the sulfur-containing species providing sulfur-free gas hydrocarbon feed.

It will also be understood that spent sorbent must be periodically removed and replaced.

If spent sorbent should come into contact with water, $H_2S$ is released, requiring only experts to handle such equipment during removal and disposal of spent sorbent.

Thus there is a need in the industry for a disposable self-sealing sorbent vessel which will significantly minimize, if not altogether eliminate, the potential of contact of the sorbent with water during removal and disposal thereof.

SUMMARY OF THE INVENTION

According to the invention, there is provided a desulfurization reactor assembly having first and second sections, the first section comprising a plenum base having a vapor inflow pathway, a vapor outflow pathway, and a throughflow pathway for passage of heating medium therethrough for heating of vapor in the inflow and outflow pathways; the second section comprising a canister having a shell within which is seated a disposable self-sealing sorbent vessel, the sorbent vessel containing desulfurization sorbent therein and having a normally sealed vapor inflow pathway inlet and a normally sealed vapor outflow pathway outlet, and the shell and sorbent vessel being spaced apart and creating a heating medium throughflow pathway; the pathways in the second section aligning with the corresponding pathways in the first section when the sections are appropriately engaged; and the first section incorporating structure therein for causing and maintaining opening of the self-sealing inlet and outlet in the sorbent vessel of the second section whenever the sections are engaged and until disengagement therebetween.

BRIEF DESCRIPTION OF THE DRAWINGS

FIG. 2 is a cross-sectional view through a plenum base of the assembly.

FIG. 3 is a cross-sectional view through a removable canister of the assembly.

DESCRIPTION OF THE PREFERRED EMBODIMENT

Figure 1:
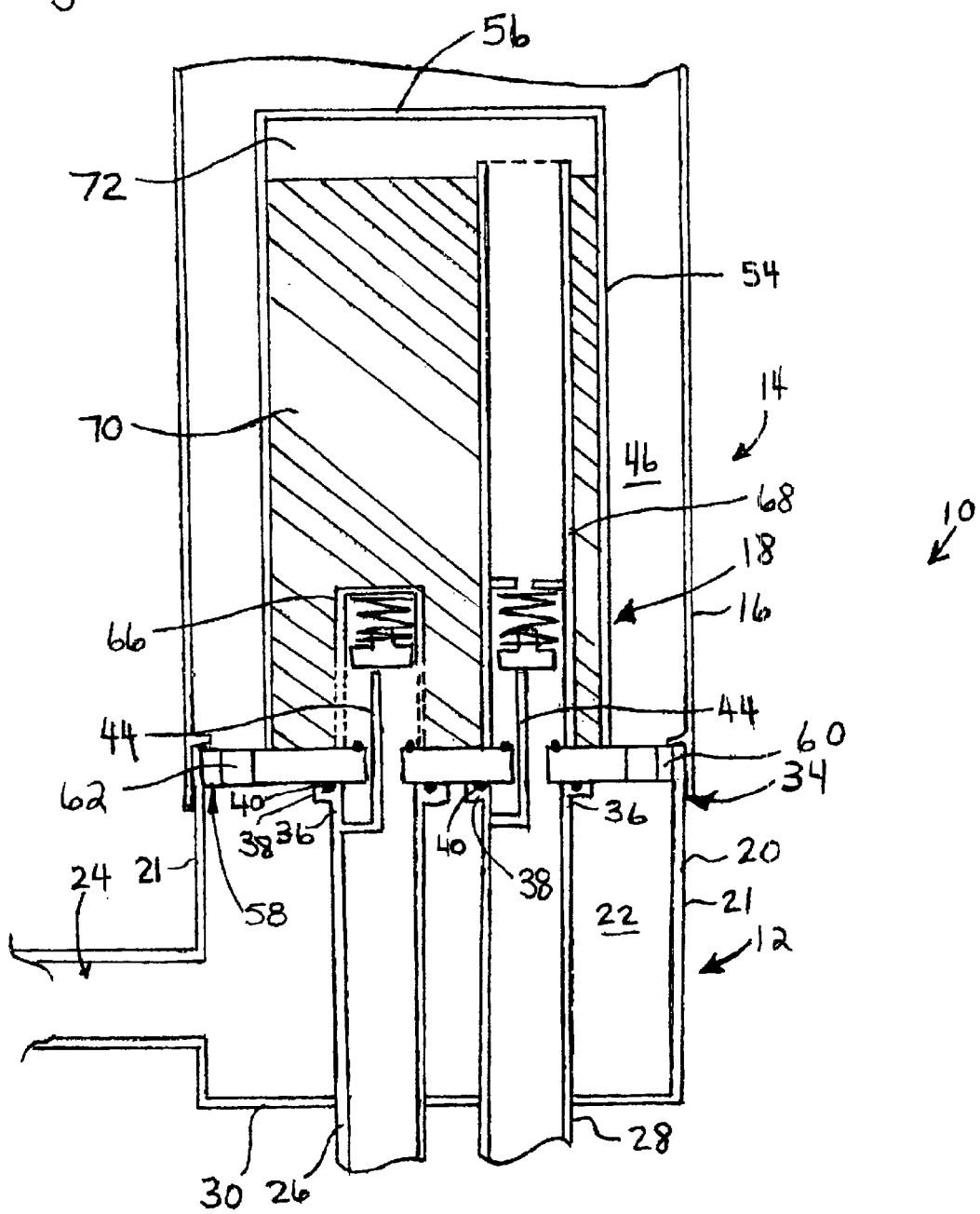
FIG. 1 is a cross-sectional view through the desulfurization reactor assembly of the present invention.
Figure 4:
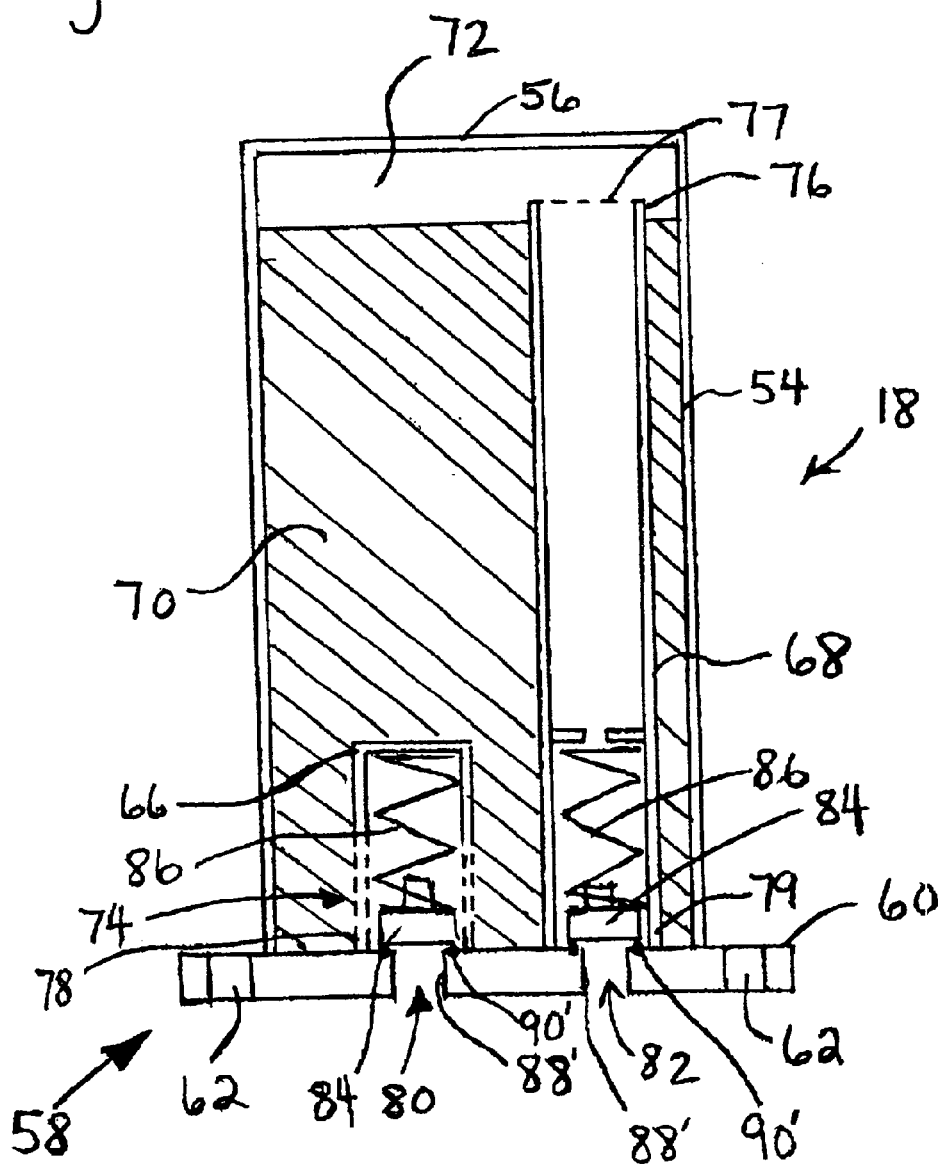
FIG. 4 is a cross-sectional view through a disposable self-sealing sorbent vessel functionally engaged within the removable canister.

Referring now to the drawings in greater detail, there is illustrated therein the desulfurization reactor assembly made in accordance with the teachings of the present invention and generally identified by the reference numeral 10.

The assembly 10 in FIG. 1 is seen to be composed of two sections in the disclosed embodiment.

The first section is a plenum base 12 and the second section is a two-piece section 14 which is releasably fixed to the plenum base 12. The second section 14 is seen to include an outer shell, canister, or housing 16 within which a disposable self-sealing sorbent vessel 18 is functionally engaged.

Referring to FIG. 2, the plenum base 12 will be seen to comprise a housing or shell 20 defining an open chamber 22 therein into which a heating medium from any suitable source is fed via an inlet 24.

Traversing one extent of the open chamber 22 are first and second tubes 26 and 28, respectively, which extend through one wall 30 of the shell 20 and terminate at a point coplanar to a point where side wall 21 of the plenum shell 20 terminates, leaving an end 34 of the open chamber 22 open. The end 36 of each tube 26, 28 within the open chamber 22 includes a peripheral flange 38 which supports an 0-ring 40 thereon.

Extending longitudinally outwardly of the end 36 of each tube 26, 28 is a plunger 44 of predetermined length which is preferably centered relative to the circumference of the tubes 26, 28. Action of the plunger 44 will be described hereinafter.

Turning now to the two-piece second section 14 in FIG. 3, the two-piece second section is seen to include an outer shell, canister, or housing 16 of substantially similar peripheral dimension and configuration as that of the plenum base 12. The shell 16 defines an open chamber 46 therein having an outlet 48 therefrom at one end 50 and having an open end 52 opposite the outlet end 50.

Received in a diametrically centered orientation within the shell 16 is the disposable self-sealing sorbent vessel 18. The peripheral wall 54 and a closed end wall 56 of the vessel 18 are spaced inwardly of the shell 16, creating a cylindrical chamber 46 extending therearound.

The vessel 18 also has an active end 58 which engages over and coacts with structure at the open end 34 of the plenum base 12.

The active end 58 includes a base plate 60 which includes a plurality of radially arrayed ports 62 extending therethrough in a peripheral area of the plate 60 which extends radially beyond the peripheral wall 54 of the vessel 18. Such ports 62 create a path communicating the open chamber 22 of the plenum base 12 with the chamber 46 defined within the shell 16, surrounding the vessel 18, when the sections 12 and 14 are functionally engaged as illustrated in FIG. 1.

Extending into the vessel 18, from the base plate 60 are first and second tubes 66 and 68, respectively, which, when the vessel 18 is properly engaged over the open end 34 of the plenum base 12, align with and form continuations of tubes 26 and 28, respectively, within the plenum base 12.

Here, it must be recognized that the vessel 18 is substantially filled with a desulfurization sorbent 70 such as ZnO.

It will be seen that the tube 66 is relatively short, terminating within the area filled with sorbent 70 and forming an outflow path 66 while the tube 68 is relatively long, terminating within a void 72 above the area filled with sorbent 70 and forming an inflow path 68.

Tube 66 is constructed to include an area 74 which is vapor permeable but which will not allow the sorbent 70 to pass therethrough. Likewise tube 68 has an open outlet 76 which is covered by a screen 77, forming a screened end which is vapor permeable but which will not allow the sorbent 70 to pass therethrough.

Tube 66 has an outlet 78 and tube 68 has an inlet 79, the outlet 78 and inlet 79 being proximate the base plate 60. Ports 80 and 82, respectively, are provided in the base plate 60 leading to the outlet 78 and inlet 79 of each respective tube 66 and 68.

The inlet 79 and outlet 78 each include a spring biased closure or plug 84 which is biased by a spring 86 toward and against the base plate 60 when the vessel 18 is disengaged from the plenum base 12.

It will be seen that each port 80 and 82 is of decreased circumference relative to a circumference of the outlet 78 and inlet 79, creating an inwardly directed peripheral flange 88' for each tube 66 and 68. An O-ring 90' is mounted on this peripheral flange 88' to assure a tight seal between the closure or plug 84 and the peripheral flange 88' of the base plate 60.

Such structuring of the outlet 78 and inlet 79 creates a self-sealing vessel 18. Such self-sealing substantially reduces, if not altogether eliminates, any potential for the sorbent 70 within the vessel 18 to come in contact with water during replacement and disposal of the disposable vessel 18.

Inasmuch as the outlet 78 and inlet 79 of the vessel 18 are each sealed by a spring biased closure or plug 84, it is obviously necessary to provide means for causing opening of the plug 84 of each tube 66 and 68 when the vessel 18 is functionally engaged over the open end 34 of the plenum base 12.

It is for such purpose that the plunger 44 is provided for each tube 26 and 28 in the plenum base 12. Viewing FIG. 1, it will be understood that upon engagement of the active end 58 of vessel 18 over the open end 34 of the plenum base 12, each of the plungers 44 passes through a corresponding port 80 or 82 in the base plate 60, pushing the closure or plug 84 into the respective tube 66 or 68 a predetermined distance to effect opening of the outlet 78 and inlet 79 to permit passage of vapor therethrough.

In use, it will be understood that the active end 58 of the vessel 18 is seated appropriately over the open end 34 of the plenum base 12, aligning tubes 26 and 66 and tubes 28 and 68, with each plunger 44 opening the respective outlet 78 and inlet 79 of the corresponding tube 66 and 68, with the shell 16 engaging thereover.

Inlet 24 to the plenum base 12 is engaged to a source of heating medium with the medium passing into and through open chamber 22 of the plenum base 12, through the radially arrayed ports 62 in the base plate 60 into and through cylindrical chamber 46 within shell 16, and out outlet 48 therefrom to any desired location.

Next, tube 28 is engaged to a source of vapor to be desulfurized with the vapor passing along tube 28, through port 82 in the base plate 60 of the vessel 18, through the tube 68 and out of screened end 76 thereof, into void 72, through the area filled with sorbent 70, entering tube 66 through the vapor permeable area 74 thereof, through port 80 in the base plate 60, and into and through tube 26 in the plenum base 12, from where the vapor, desulfurized by passage thereof through the sorbent 70, may now be fed to a fuel processor without fear of damaging the process catalyst therein.

It will be understood that both the heating medium and vapor to be desulfurized are fed through the assembly 10 under pressure. Thus, the shell 16 and the vessel 18 must be securely engaged to the plenum base 12.

In a preferred embodiment, the shell 16 may be screw threaded onto and over the open end 34 of the plenum base 12, though this should not be construed as limiting. Also, in the preferred embodiment, an inner surface 88 of the shell 16 may be provided with a circumferential flange 90 which will seat the base plate 60 of the vessel 18 firmly against the structures at the open end 34 of the plenum base 12, when the shell 16 is engaged to the plenum base 12, though this should also not be construed as limiting.

As disclosed, the desulfurization assembly 10 of the present invention provides a number of advantages, some of which have been described above and others of which are inherent in the invention. Also, modifications may be proposed to the assembly 10 without departing from the teachings herein. Accordingly, the scope of the invention is only to be limited as necessitated by the accompanying claims.

We claim:

1. A desulfurization reactor assembly having first and second sections, the first section comprising a plenum base including a vapor inflow pathway, a vapor outflow pathway, and a throughflow pathway for passage of heating medium therethrough for heating of vapor in the inflow and outflow pathways; the second section comprising two pieces and including a shell within which is seated a disposable self-sealing sorbent vessel, the sorbent vessel containing desulfurization sorbent therein and having a self-sealing normally closed inlet to the vapor inflow pathway and a self-sealing normally closed outlet from the vapor outflow pathway, and the shell and sorbent vessel being spaced apart and creating a heating medium throughflow pathway therebetween; all pathways in the second section aligning with the corresponding pathway in the first section when the sections are functionally engaged; and the first section incorporating structure therein for causing and maintaining opening of the normally closed pathways in the vessel of the second section whenever the sections are functionally engaged and until disengagement therebetween.

2. The reactor assembly of claim 1 wherein the self-sealing inlet and outlet of the sorbent vessel each include a plug biased by a spring to a normally closed position.

3. The reactor assembly of claim 2 wherein each vapor pathway in the first section has an opening which aligns with the corresponding self-sealing inlet and outlet in the sorbent vessel and includes a plunger extending outwardly of the opening and causes retraction of the corresponding plug.

4. The reactor assembly of claim 3 wherein the sorbent vessel includes a base plate extending across the end of the vessel engaged to the plenum base and extends radially into abutment with the shell engaged thereover.

5. The reactor assembly of claim 4 wherein a plurality of radial ports are provided in the base plate in a circumferental area extending radially past the vessel to allow communication between the heating medium flowthrough pathways of the first and second sections.

6. The reactor assembly of claim 5 wherein a throughport is provided in the base plate for allowing communication between corresponding vapor pathways of the first and second sections.

7. The reactor assembly of claim 6 wherein each throughport is of lesser diameter than a diameter of the vapor pathway.

8. The reactor assembly of claim 7 wherein the self-sealing plug is of greater diameter than a diameter of said throughport.

* * * * *